United States Patent
Ives

(10) Patent No.: US 11,738,881 B2
(45) Date of Patent: Aug. 29, 2023

(54) AUXILIARY POWER UNIT SYSTEMS

(71) Applicant: Hamilton Sundstrand Corporation, Charlotte, NC (US)

(72) Inventor: Kyle Stephen Ives, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 145 days.

(21) Appl. No.: 17/073,216

(22) Filed: Oct. 16, 2020

(65) Prior Publication Data

US 2021/0114744 A1    Apr. 22, 2021

Related U.S. Application Data

(60) Provisional application No. 62/924,036, filed on Oct. 21, 2019.

(51) Int. Cl.
*B64D 41/00* (2006.01)

(52) U.S. Cl.
CPC ........ *B64D 41/00* (2013.01); *B64D 2041/002* (2013.01); *B64D 2221/00* (2013.01)

(58) Field of Classification Search
CPC .............................. B64D 41/00; B64D 2221/00
See application file for complete search history.

(56) References Cited

U.S. PATENT DOCUMENTS

| | | | |
|---|---|---|---|
| 6,641,084 B1 * | 11/2003 | Huber | H01M 8/00 429/496 |
| 6,703,747 B2 | 3/2004 | Kawamura | |
| 6,864,667 B2 | 3/2005 | Buening et al. | |
| 7,122,933 B2 | 10/2006 | Horst et al. | |
| 7,915,778 B2 | 3/2011 | Miyata et al. | |
| 8,350,437 B2 | 1/2013 | Doushita et al. | |
| 8,358,046 B2 | 1/2013 | Platon | |
| 8,368,276 B2 | 2/2013 | Wolf et al. | |
| 8,532,961 B2 | 9/2013 | Guo | |

(Continued)

FOREIGN PATENT DOCUMENTS

| | | |
|---|---|---|
| BR | PI0622106 A2 | 12/2011 |
| BR | 102014025950 A2 | 5/2016 |

(Continued)

OTHER PUBLICATIONS

Extended European search report issued in corresponding EP application No. 20203052.4, dated Mar. 5, 2021.

*Primary Examiner* — Timothy D Collins
*Assistant Examiner* — Justin Michael Heston
(74) *Attorney, Agent, or Firm* — Scott D. Wofsy; Joshua L. Jones; Gabrielle L. Gelozin

(57) ABSTRACT

An auxiliary power unit (APU) system for an aircraft can include a fuel consuming system configured to generate and output electrical energy for use by one or more aircraft systems and a battery system configured to output stored electrical energy for use by the one or more aircraft systems. The fuel consuming system can include a fuel consuming APU, and an APU generator operatively connected to the fuel consuming APU and configured to convert APU motion into APU generator alternating current (AC). The system can include a high voltage AC line operatively connected to the generator. The battery system can include a battery configured to output battery direct current (DC).

7 Claims, 9 Drawing Sheets

(56) References Cited

U.S. PATENT DOCUMENTS

| | | |
|---|---|---|
| 8,844,143 B2 | 9/2014 | Kirchner et al. |
| 9,174,741 B2 | 11/2015 | Suntharalingam et al. |
| 10,170,954 B2 | 1/2019 | Taniguchi et al. |
| 10,326,326 B2 | 6/2019 | Laldin et al. |
| 10,494,117 B2 | 12/2019 | Bosma |
| 2005/0237766 A1 | 10/2005 | Klettke |
| 2006/0168968 A1* | 8/2006 | Zielinski ............. F02C 7/277 |
| | | 60/778 |
| 2008/0017426 A1 | 1/2008 | Walters et al. |
| 2008/0078876 A1 | 4/2008 | Baggette et al. |
| 2008/0141921 A1 | 6/2008 | Hinderks |
| 2010/0193630 A1* | 8/2010 | Duces ................. H02J 4/00 |
| | | 244/58 |
| 2010/0251692 A1 | 10/2010 | Kinde, Sr. |
| 2010/0270417 A1 | 10/2010 | Goldshteyn |
| 2011/0024555 A1 | 2/2011 | Kuhn, Jr. |
| 2011/0049293 A1 | 3/2011 | Koletzko |
| 2012/0012692 A1 | 1/2012 | Kroo |
| 2012/0111994 A1 | 5/2012 | Kummer et al. |
| 2012/0227389 A1 | 9/2012 | Hinderks |
| 2013/0020429 A1 | 1/2013 | Kroo |
| 2013/0068876 A1 | 3/2013 | Radu |
| 2013/0157017 A1 | 6/2013 | Guillemaut et al. |
| 2014/0180507 A1 | 6/2014 | Geay et al. |
| 2015/0183518 A1 | 7/2015 | Stuckl et al. |
| 2015/0210407 A1 | 7/2015 | Griffin et al. |
| 2015/0321752 A1 | 11/2015 | Trull et al. |
| 2016/0023747 A1 | 1/2016 | Kempshall |
| 2016/0144957 A1 | 5/2016 | Claridge et al. |
| 2016/0221680 A1 | 8/2016 | Burton et al. |
| 2016/0229513 A1* | 8/2016 | Scheel ................. B64D 29/08 |
| 2016/0272310 A1 | 9/2016 | Chan et al. |
| 2016/0304199 A1 | 10/2016 | Chan et al. |
| 2016/0347446 A1 | 12/2016 | Vetter et al. |
| 2017/0320585 A1 | 11/2017 | Armstrong et al. |
| 2017/0341725 A1 | 11/2017 | Skahan |
| 2018/0127103 A1 | 5/2018 | Cantemir |
| 2018/0141655 A1 | 5/2018 | Wall |
| 2018/0208305 A1 | 7/2018 | Lloyd et al. |
| 2018/0215462 A1 | 8/2018 | Fenny et al. |
| 2018/0273198 A1* | 9/2018 | Chang ................. G01F 9/001 |
| 2019/0393809 A1* | 12/2019 | Lacaux ............... B64D 33/00 |

FOREIGN PATENT DOCUMENTS

| | | |
|---|---|---|
| EP | 3594125 A1 | 1/2020 |
| JP | 2014159255 A | 9/2014 |
| JP | 2015006650 A | 1/2015 |
| JP | WO2017126584 A1 | 12/2018 |
| KR | 200408970 Y1 | 2/2006 |
| KR | 20070039699 A | 4/2007 |
| KR | 101277645 B1 | 6/2013 |
| KR | 20150018018 A | 2/2015 |
| KR | 101513661 B | 4/2015 |
| KR | 101659783 B1 | 9/2016 |
| KR | 101752859 B1 | 6/2017 |
| WO | 2009053649 A1 | 4/2009 |
| WO | 2010020199 A1 | 2/2010 |
| WO | 2011005066 A2 | 1/2011 |
| WO | 2018058137 A1 | 3/2018 |
| WO | 2018099856 A1 | 6/2018 |
| WO | 2018104929 A1 | 6/2018 |

\* cited by examiner

AUXILIARY POWER UNIT SYSTEMS

CROSS-REFERENCE TO RELATED APPLICATIONS

This application claims priority to and the benefit of U.S. Provisional Application No. 62/924,036, filed Oct. 21, 2019, the entire contents of which are herein incorporated by reference in their entirety.

FIELD

This disclosure relates to auxiliary power units (APUs) and related systems.

BACKGROUND

Aircraft rely on Auxiliary Power Units (APUs) to provide three main functions, i.e., starting the aircraft main engines, providing compressed air to the environmental control systems, and providing electrical power to the aircraft accessory systems when the main generators are not running. Traditional APUs are typically turbines which require fuel to be used, and can also contribute to airport noise and air pollution. Airport Ground Service Equipment may be used as an alternative, but is not always available at all locations where an airplane may be operated or serviced.

Such conventional methods and systems have generally been considered satisfactory for their intended purpose. However, there is still a need in the art for improved APU systems. The present disclosure provides a solution for this need.

SUMMARY

An auxiliary power unit (APU) system for an aircraft can include a fuel consuming system configured to generate and output electrical energy for use by one or more aircraft systems and a battery system configured to output stored electrical energy for use by the one or more aircraft systems. The fuel consuming system can include a fuel consuming APU, and an APU generator operatively connected to the fuel consuming APU and configured to convert APU motion into APU generator alternating current (AC). The system can include a high voltage AC line operatively connected to the generator. The battery system can include a battery configured to output battery direct current (DC).

The system can include a battery controller configured to control discharging and/or charging of the battery. The system can include an AC-DC converter disposed between the high voltage AC line and the battery system and configured to convert the battery DC to battery energy AC (e.g., high voltage AC) to output the battery energy AC to the high voltage AC line. The AC-DC converter can be configured to convert APU generator AC to generator DC current for charging the battery.

The system can include a DC-AC converter operatively connected to the AC-DC converter and configured to convert generator DC from the AC-DC converter and/or battery DC from the battery system into compressor AC configured to operate a cabin air compressor. The system can include an AC-AC converter disposed on the high voltage AC line and configured to receive APU generator AC or battery energy AC to condition the APU generator AC or battery energy AC to be used by an engine starter or to be used by an aircraft electrical bus. Any converter (e.g., AC-DC, DC-AC, AC-AC) disclosed herein can be unidirectional or bidirectional, and can include any suitable components and/or combinations of converters.

The system can include a control module configured to control the APU system to operate in one or more modes, independently or in any combination. The one or more modes can include at least one of a battery driven engine start mode where the battery provides electrical energy to the engine starter through the AC-DC converter, the high voltage line, and the AC-AC converter, a battery driven auxiliary electrical power mode wherein the battery provides electrical energy to the aircraft electrical bus through the AC-DC converter, the high voltage line, and the AC-AC converter, a battery driven cabin air mode where the battery provides electrical energy to the cabin air compressor through the DC-AC converter, an APU generator driven cabin air mode where the APU generator provides electrical energy to the cabin air compressor through the AC-DC converter and then the DC-AC converter, an APU generator driven auxiliary electrical power mode where the APU generator provides electrical energy to the aircraft electrical bus through the AC-AC converter, an APU generator driven engine start mode where the APU generator provides electrical energy to the engine starter through the AC-AC converter, an APU generator driven battery charging mode where the APU generator provides electrical energy to the battery through the AC-DC converter and the battery controller to charge the battery, and/or an aircraft electrical bus driven battery charging mode where the aircraft electrical bus provides electrical energy to the battery through the AC-AC converter, the AC-DC converter, and the battery controller to charge the battery. Any other suitable modes are contemplated herein.

The control module can be configured to operate the system in the APU generator driven cabin air mode, the APU generator driven auxiliary electrical power mode, the APU generator driven engine start mode, and/or the APU generator driven battery charging mode for no more than 15 minutes consecutively (e.g., or any other suitable period of time allowed at a particular airport), and to use the battery driven engine start mode, and/or the battery driven cabin air mode in such a manner that more than 15 minutes of usage of the APU is prevented to reduce APU noise pollution. Any other suitable control scheme is contemplated herein (e.g., as a function of battery charge state).

In accordance with at least one aspect of this disclosure, an aircraft can include an auxiliary power unit (APU) system as disclosed herein, e.g., as described above. The aircraft can include any other suitable components and/or systems as appreciated by those having ordinary skill in the art. In accordance with at least one aspect of this disclosure, a method can include switching between a fuel consuming APU system and a battery system to provide electrical energy to one or more aircraft systems such that the fuel consuming APU system is limited to operating only for a predetermined period of time consecutively. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
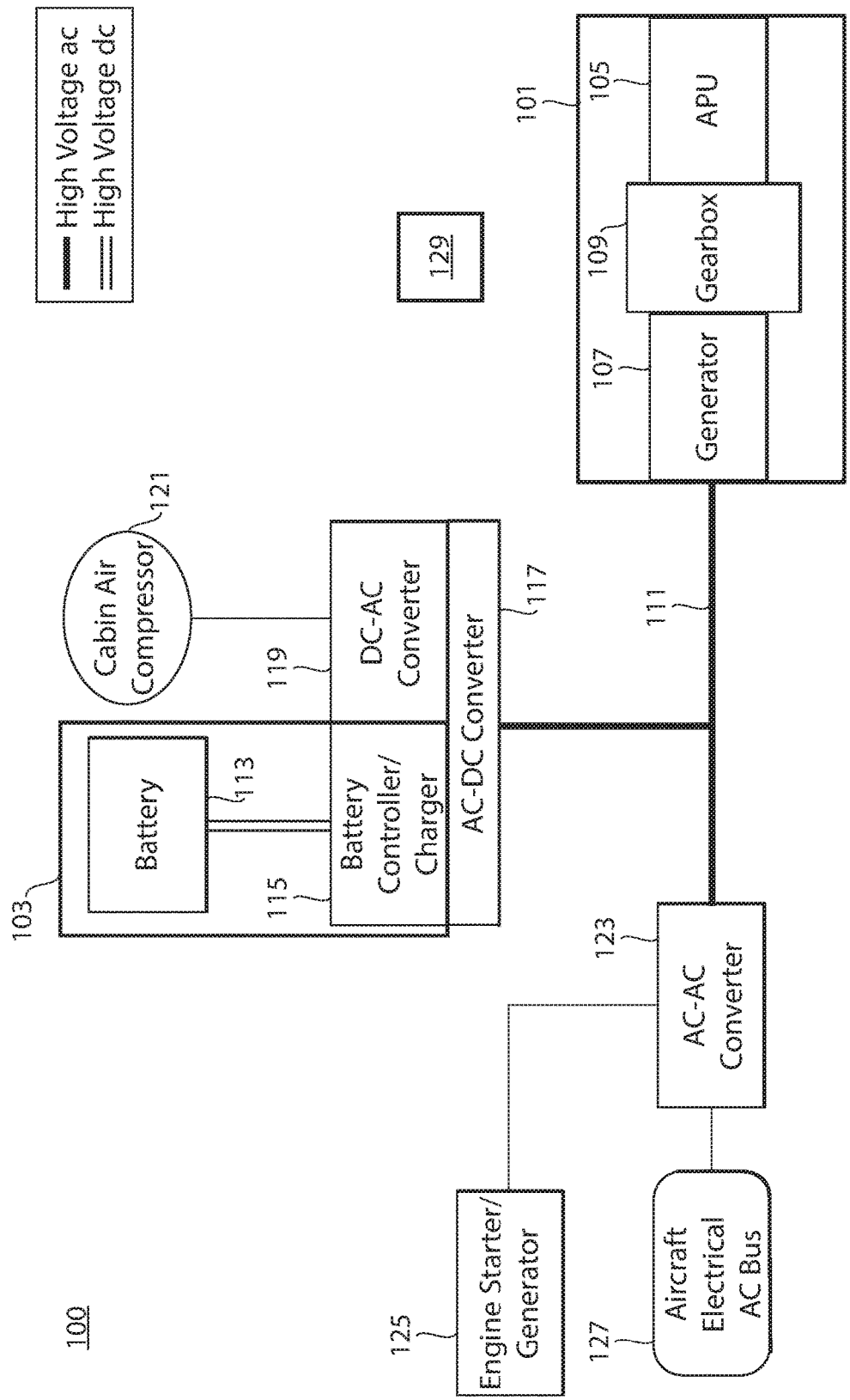
FIG. 1 is a schematic diagram of an embodiment of an APU system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-9.

Referring to FIG. 1, an auxiliary power unit (APU) system 100 for an aircraft (not shown) can include a fuel consuming system 101 configured to generate and output electrical energy for use by one or more aircraft systems (e.g., engine starter, environmental control system, aircraft electrical bus) and a battery system 103 configured to output stored electrical energy for use by the one or more aircraft systems. The fuel consuming system 101 can include a fuel consuming APU 105 (e.g., a turbomachine APU), and an APU generator 107 operatively connected to the fuel consuming APU 105 (e.g., via a gearbox 109 or directly) and configured to convert APU motion into APU generator alternating current (AC) (e.g., high voltage). The system 100 can include a high voltage AC line 111 operatively connected to the generator 107.

The battery system 103 can include a battery 113 (e.g., including any suitable number of batteries and/or cells) configured to output battery direct current (DC) (e.g., high voltage). The battery system 103 can include a battery controller 115 (e.g., having any suitable power electronics) configured to control discharging and/or charging of the battery 113. The battery 113 can be a high voltage battery for use in hybrid electric aircraft propulsion. Certain embodiments can include an entirely separate battery only for usage with the APU system 100 for APU functions.

The system 100 can include an AC-DC converter 117 disposed between the high voltage AC line 111 and the battery system 103 and configured to convert the battery DC (e.g., high voltage) to battery energy AC (e.g., high voltage) to output the battery energy AC to the high voltage AC line 111. The AC-DC converter 117 can be configured to convert APU generator AC to generator DC current for charging the battery 113.

The system 100 can include a DC-AC converter 119 operatively connected to the AC-DC 117 converter and/or the battery system 103. The DC-AC converter 119 can be configured to convert generator DC (e.g., high voltage) from the AC-DC converter 117 and/or battery DC (e.g., high voltage) from the battery system 103 into compressor AC configured to operate a cabin air compressor 121 (e.g., which can operates at any suitable voltage which can be a wild frequency AC voltage because the voltage level and frequency can be dependent on the current operating speed of the compressor motor).

The system 100 can include an AC-AC 123 converter disposed on the high voltage AC line 111 and configured to receive APU generator AC (e.g., high voltage) or battery energy AC (e.g., high voltage) to condition the APU generator AC or battery energy AC to be used by an engine starter 125 or to be used by an aircraft electrical bus 127 (e.g., 115V, 230V). Any converter (e.g., AC-DC, DC-AC, AC-AC) disclosed herein, e.g., above, can be unidirectional or bidirectional, and can include any suitable components and/or combinations of converters.

Figure 2:
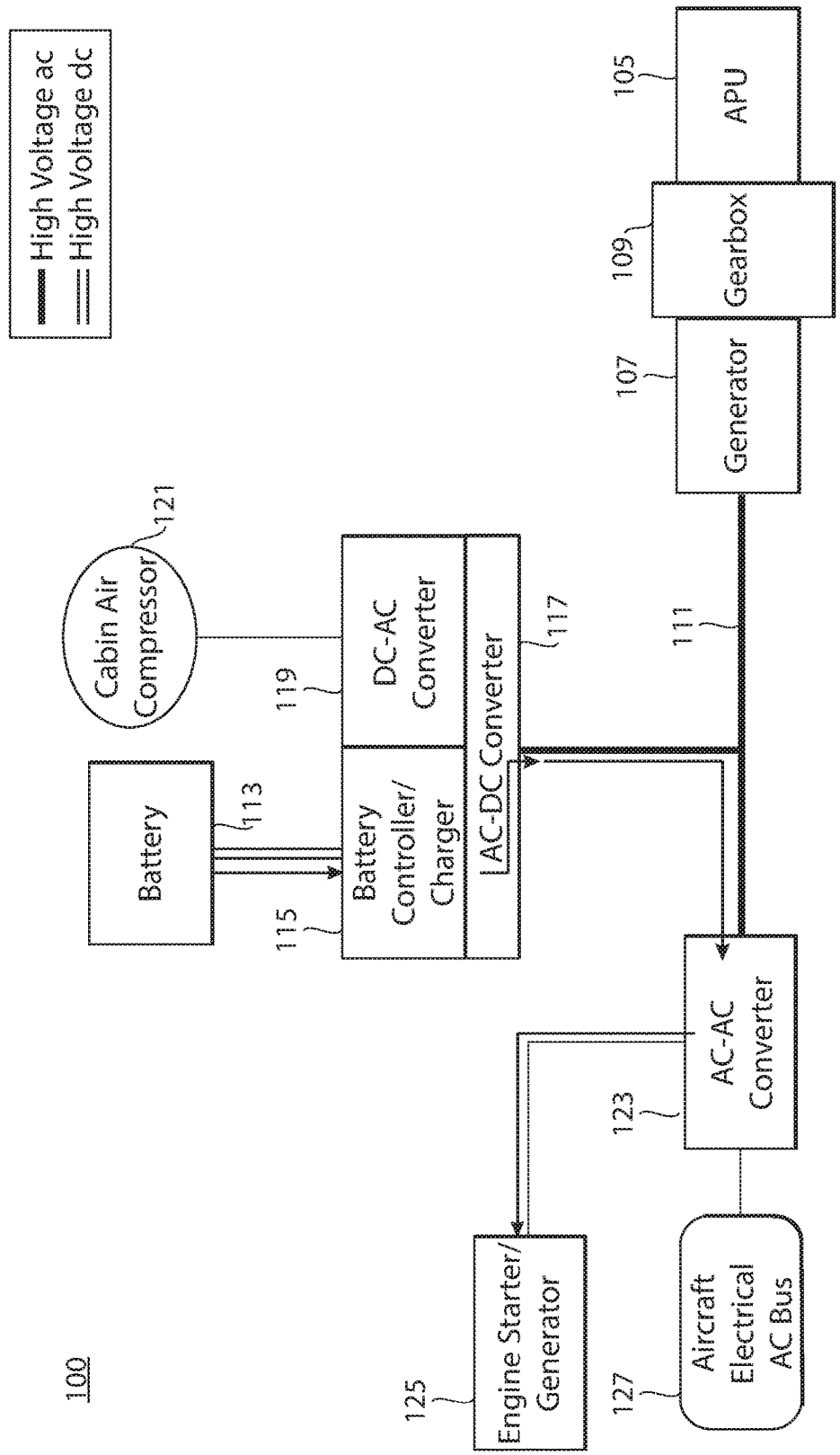
FIG. 2 is a schematic diagram of the embodiment of FIG. 1, shown operating in a battery driven engine start mode.
Figure 3:
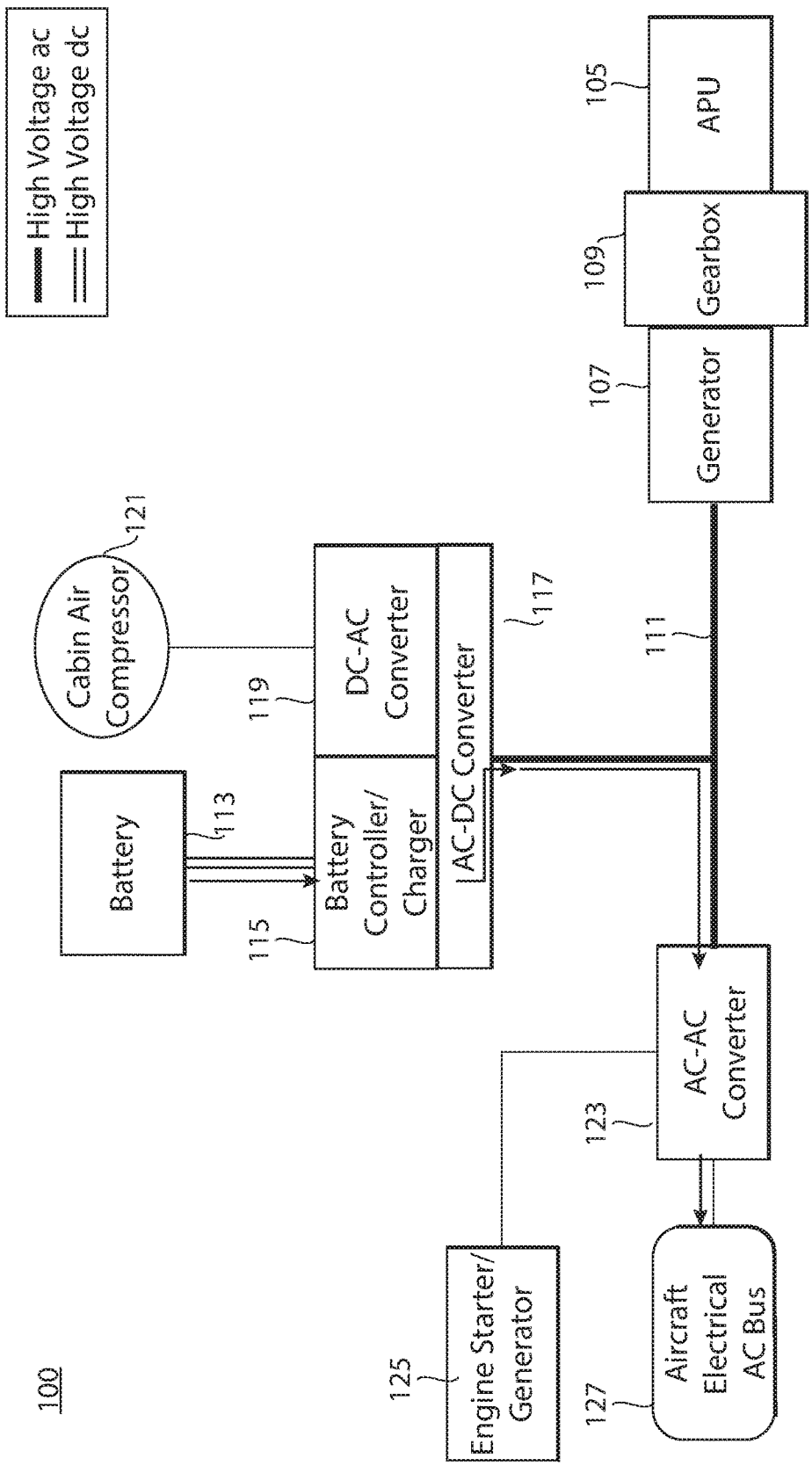
FIG. 3 is a schematic diagram of the embodiment of FIG. 1, shown operating in a battery driven auxiliary electrical power mode.

The system 100 can include a control module 129 configured to control the APU system 100 to operate in one or more modes, independently or in any combination. The control module 129 can include any suitable hardware and/or software module(s) and connections configured perform any disclosed function. Referring to FIG. 2, the one or more modes can include a battery driven engine start mode where the battery 113 provides electrical energy to the engine starter 125 through the AC-DC converter 117, the high voltage line 111, and the AC-AC converter 123. Referring to FIG. 3, the one or more modes can include a battery driven auxiliary electrical power mode wherein the battery 113 provides electrical energy to the aircraft electrical bus 127 through the AC-DC converter 117, the high voltage line 111, and the AC-AC converter 123.

Figure 4:
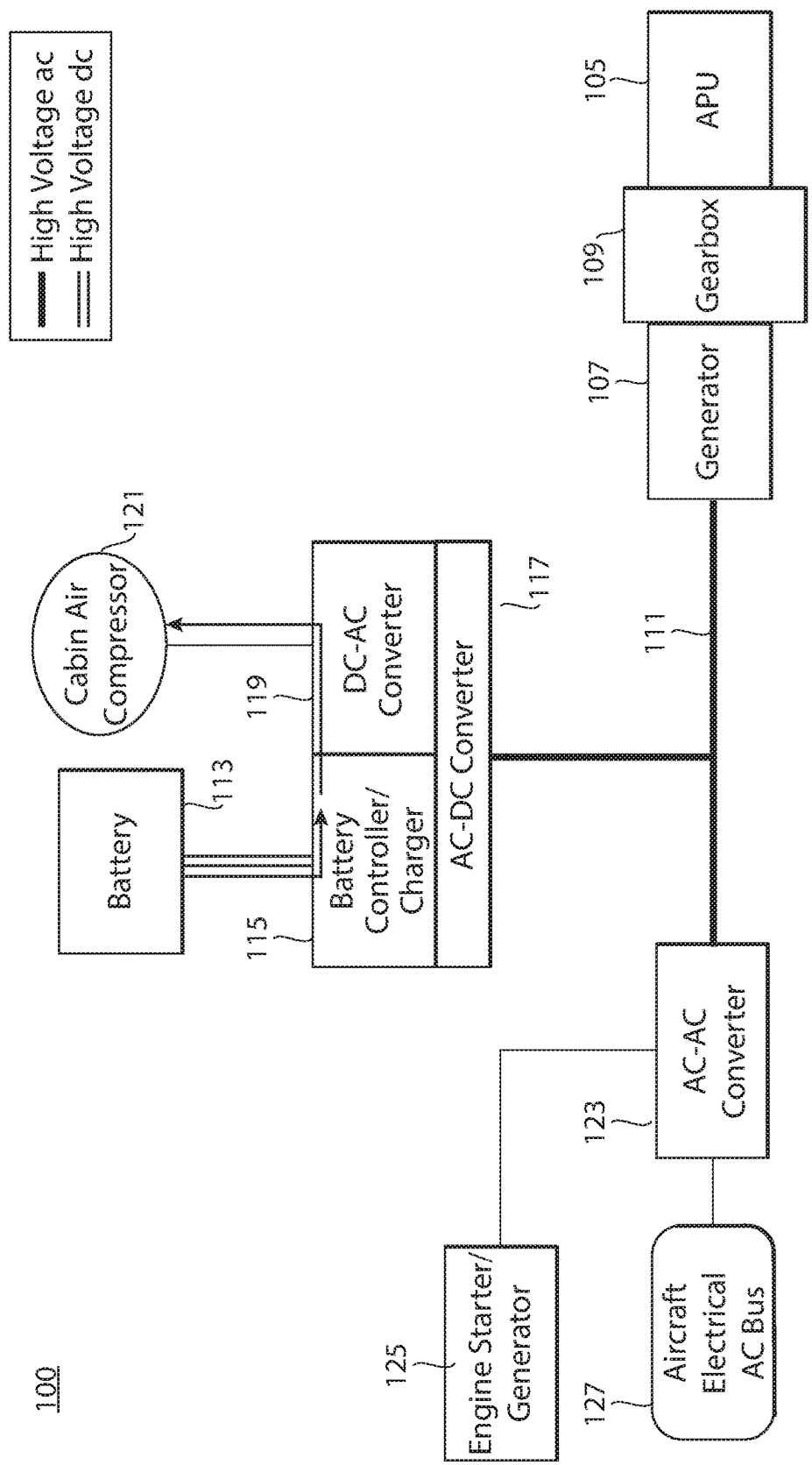
FIG. 4 is a schematic diagram of the embodiment of FIG. 1, shown operating in a battery driven cabin air mode.
Figure 5:
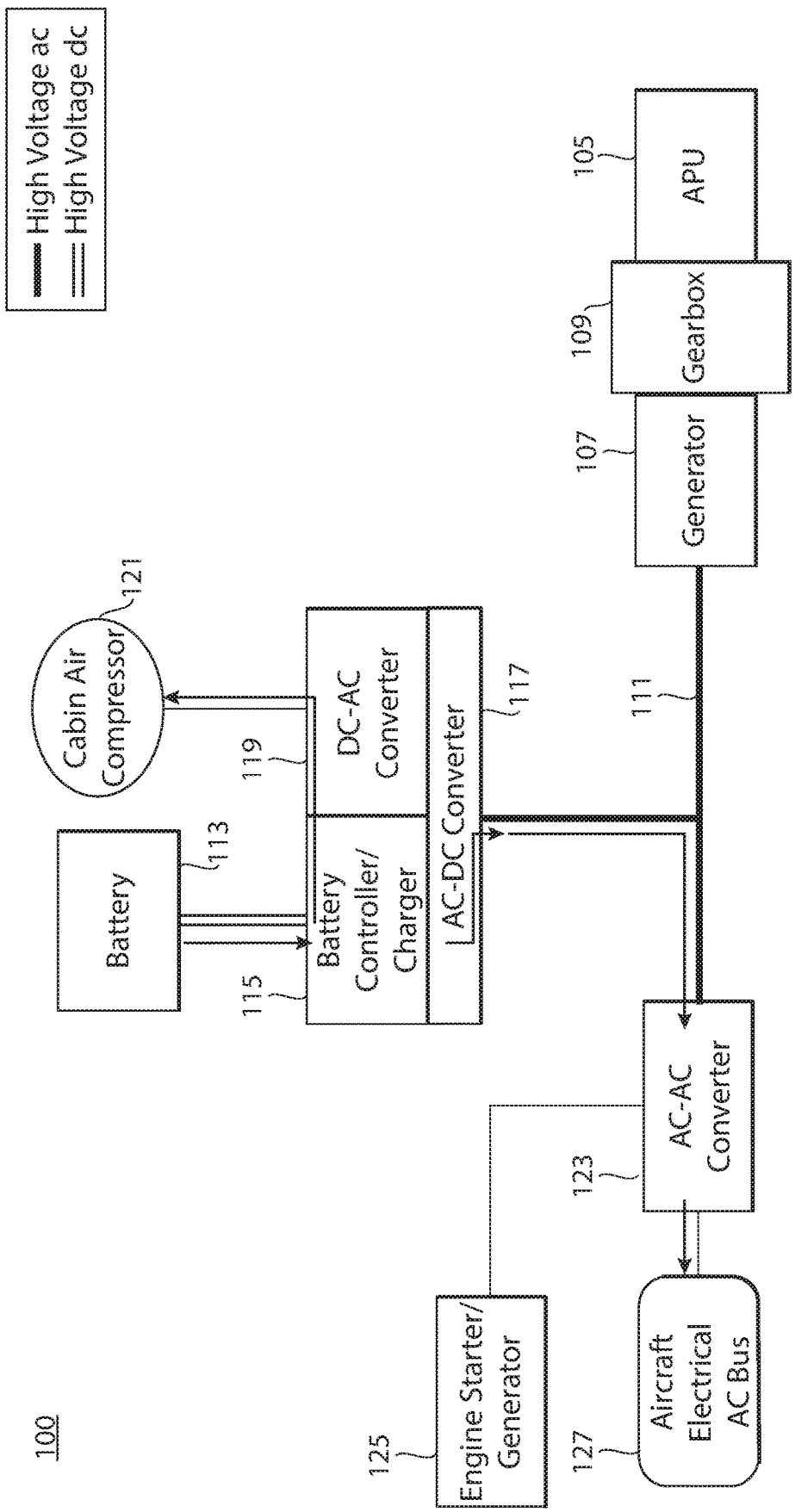
FIG. 5 is a schematic diagram of the embodiment of FIG. 1, shown operating in a battery driven auxiliary power and cabin air mode.

Referring to FIG. 4, the one or more modes can include a battery driven cabin air mode where the battery 113 provides electrical energy to the cabin air compressor 121 through the DC-AC converter 119 (e.g., which is configured to condition the voltage to drive the compressor 121). Referring to FIG. 5, the one or more modes can include a combination of the modes of FIG. 3 and FIG. 4.

Figure 6:
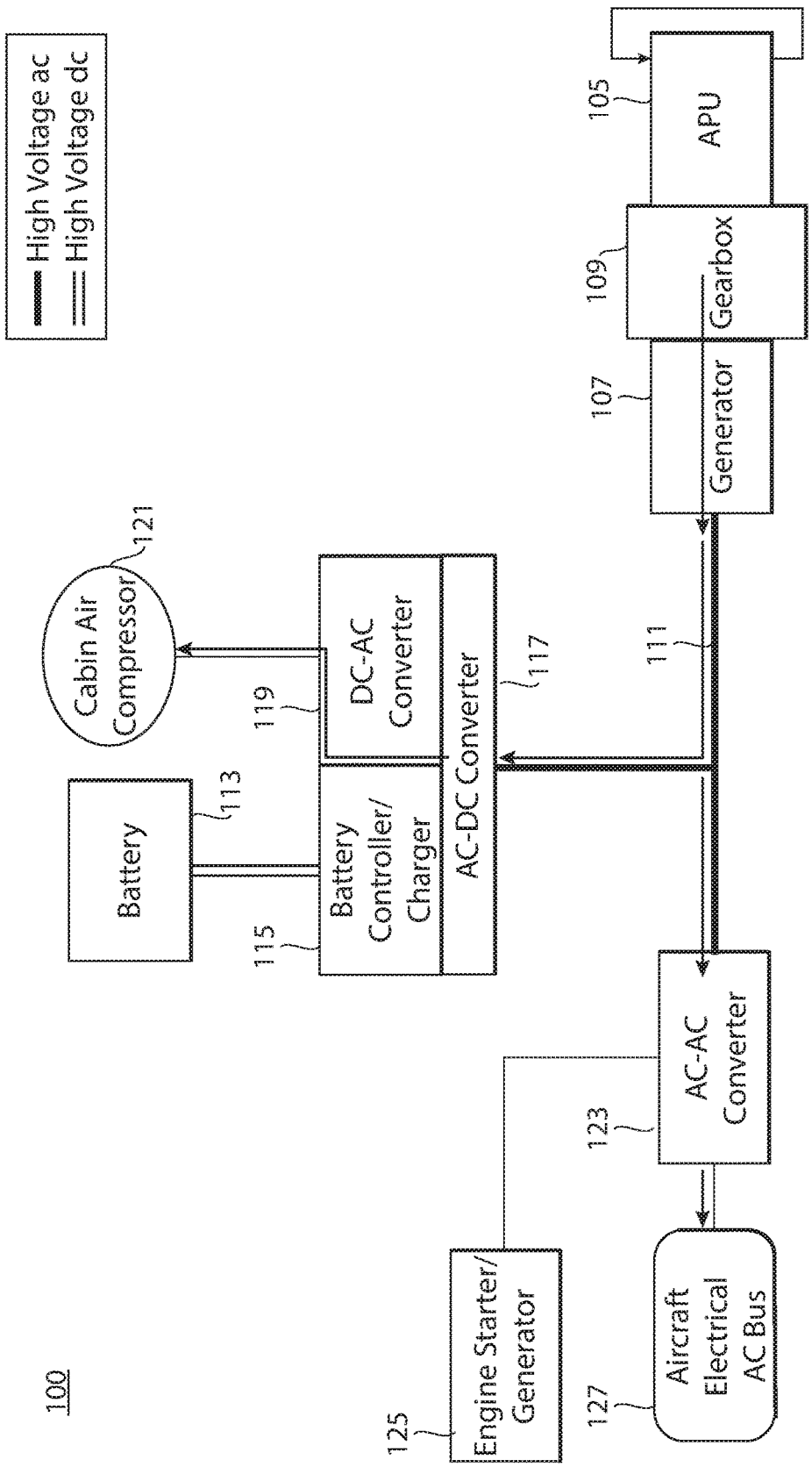
FIG. 6 is a schematic diagram of the embodiment of FIG. 1, shown operating in an APU generator driven cabin air and auxiliary power mode.

Referring to FIG. 6, the one or more modes can include an APU generator driven cabin air mode where the APU generator 107 provides electrical energy to the cabin air compressor 121 through the AC-DC converter 117 and then the DC-AC converter 119. As also shown in FIG. 6, the one or more modes can include an APU generator driven auxiliary electrical power mode where the APU generator 107 provides electrical energy to the aircraft electrical bus 127 through the AC-AC converter 123.

Figure 7:
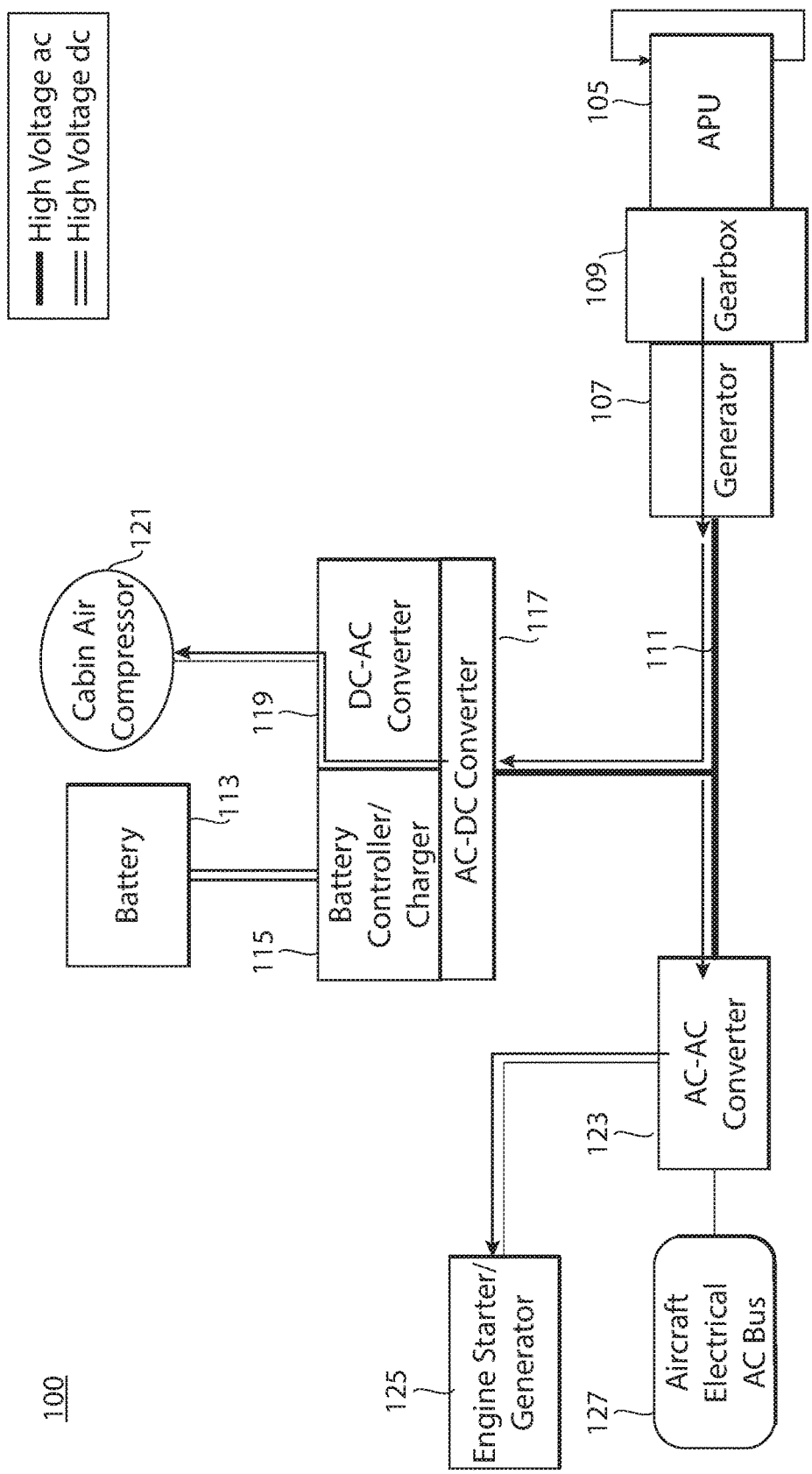
FIG. 7 is a schematic diagram of the embodiment of FIG. 1, shown operating in an APU generator driven engine start and cabin air mode.

Referring to FIG. 7, the one or more modes can include an APU generator driven engine start mode where the APU generator 107 provides electrical energy to the engine starter 125 through the AC-AC converter 123. Also as shown in FIG. 7, the APU generator driven engine start mode can be combined with the APU generator driven cabin air mode.

Figure 8:
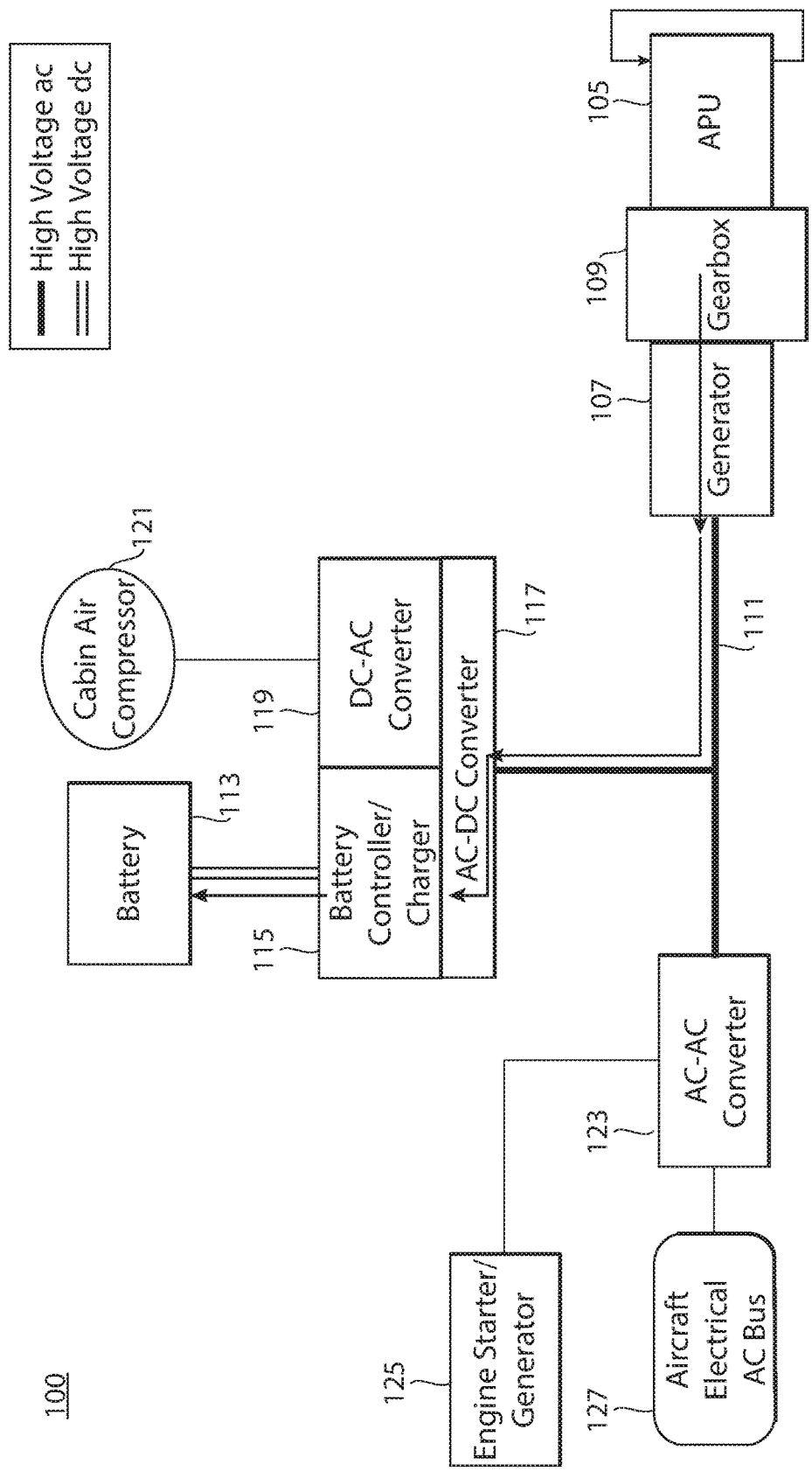
FIG. 8 is a schematic diagram of the embodiment of FIG. 1, shown operating in an APU battery charging mode.
Figure 9:
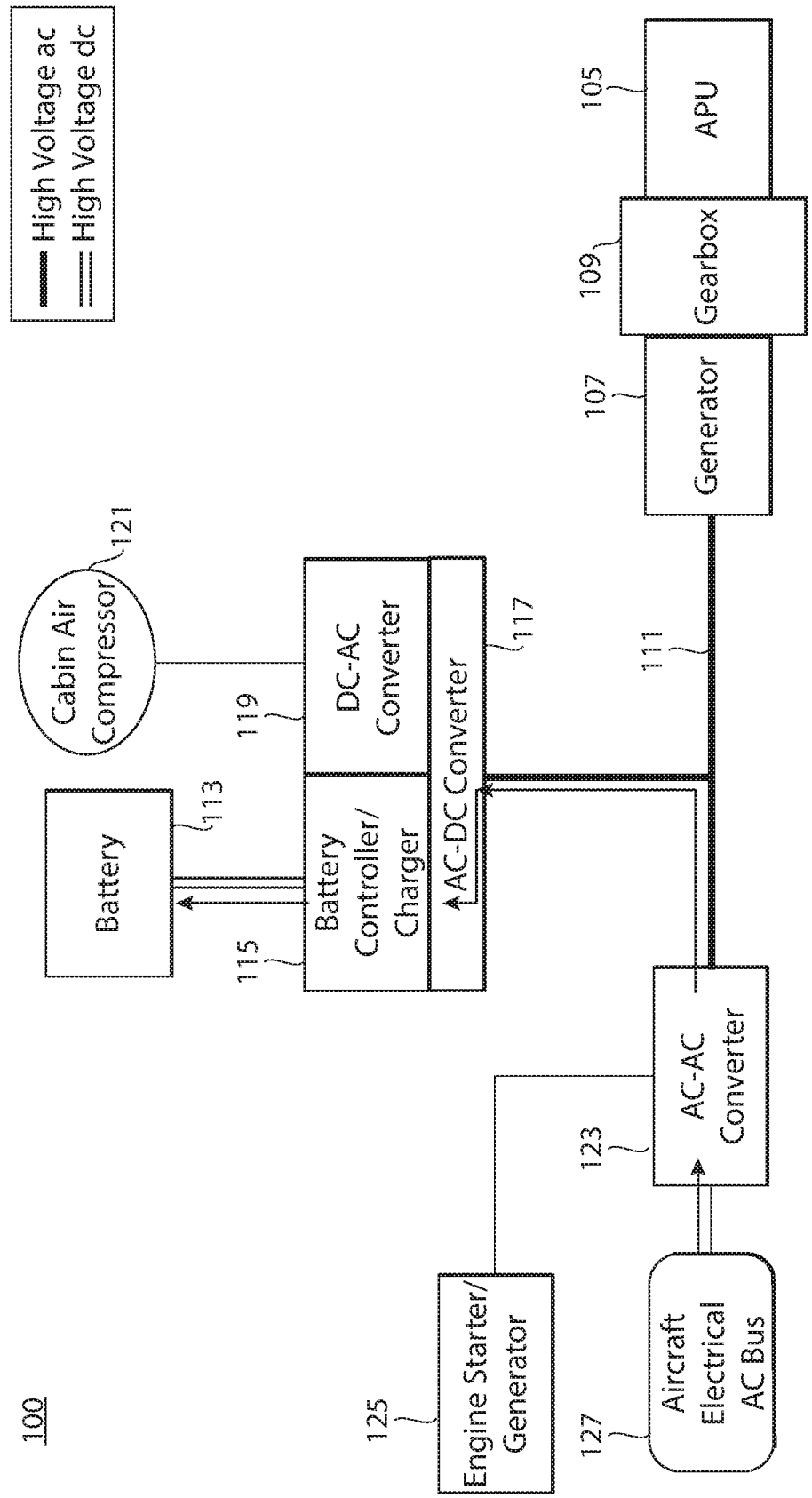
FIG. 9 is a schematic diagram of the embodiment of FIG. 1, shown operating in an aircraft electrical bus driven battery charging mode.

Referring to FIG. 8, the one or more modes can include an APU generator driven battery charging mode where the APU generator 107 provides electrical energy to the battery 113 through the AC-DC converter 117 and the battery controller 115 to charge the battery 113. Referring to FIG. 9, the one or more modes can include and/or an aircraft electrical bus driven battery charging mode where the aircraft electrical bus 127 provides electrical energy (e.g., from an engine driven AC generator or external Ground Power Unit) to the battery 113 through the AC-AC converter 123, the AC-DC converter 117, and the battery controller 115 to charge the battery 113. This mode can be used in flight when producing energy (e.g., through the engine generator) and/or can be used on ground when the aircraft is hooked up to ground power, for example.

Any other suitable modes are contemplated herein. Any suitable combination of modes is contemplated herein.

Any other suitable electrical pathways are contemplated herein (e.g., bypassing one or more converters for any suitable purpose). Any other suitable components, converters, and/or aircraft electronics for the system are contemplated herein.

The control module can be configured to operate the system in the APU generator driven cabin air mode, the APU generator driven auxiliary electrical power mode, the APU generator driven engine start mode, and/or the APU generator driven battery charging mode for no more than 15 minutes consecutively (e.g., or any other suitable period of time allowed at a particular airport), and to use the battery driven engine start mode, and/or the battery driven cabin air mode and/or any other suitable battery mode (e.g., battery aircraft electronics mode) in such a manner that more than 15 minutes of usage of the APU is prevented to reduce APU noise pollution. For example, embodiments may run in battery only mode for a set amount of time or for until a certain battery charge state is reached (e.g., no more useable charge available without damaging the battery, e.g., 5%-10% state of charge) to avoid generating noise and emissions. In certain embodiments, only after the battery has been depleted, the control module can revert to APU driven power to provide APU services and/or charge the battery. In certain embodiments, the APU generator modes can be operated for a set period of time (e.g., 15 minutes) and when more than the set period of time has been used with the APU on, the control module can switch to one or more battery-only modes and shut down the APU to reduce emissions and noise pollution, and/or to comport with local rules). The battery can be sized for any suitable anticipated use (e.g., 15 minutes to an hour of operation on the ground of battery only modes, or smaller than 15 minutes of battery only usage to reduce weight where the APU is used more on the ground). Any other suitable control scheme is contemplated herein (e.g., as a function of battery charge state).

As used herein, the term high voltage can mean about 115V and above (e.g., 270V). In certain embodiments, aircraft electronics connected to the aircraft electronics bus can typically be about 115 Vrms.

In accordance with at least one aspect of this disclosure, an aircraft can include an auxiliary power unit (APU) system as disclosed herein, e.g., system 100 as described above. The aircraft can include any other suitable components and/or systems as appreciated by those having ordinary skill in the art. In accordance with at least one aspect of this disclosure, a method can include switching between a fuel consuming APU system and a battery system to provide electrical energy to one or more aircraft systems such that the fuel consuming APU system is limited to operating only for a predetermined period of time consecutively. The method can include any other suitable method(s) and/or portion(s) thereof.

Embodiments can utilize a cabin air compressor that is an electric motor driven compressor instead of a direct APU driven compressor. Such compressors can be driven off of AC power, can be a smaller, more efficient, and can be dedicated for ground use only, reducing the amount of electrical energy required to operate. Embodiments can include a separate large compressor for in flight use, for example. Certain embodiments of an electrically driven compressor need to have conditioned AC through the DC-AC converter.

Embodiments can include one or more AC-DC/DC-AC high voltage converters integrated with the battery controller/charger. The AC-DC converter can be used for converting back fed AC from, e.g., the APU generator. The DC-AC converter can be used for converting DC back to AC conditioned to run an electric motor based compressor for the environmental control system.

Embodiments can include a control module that references state of charge of the battery and the time of use of APU and can switch between modes as needed or desired (e.g., to never run APU more than 10 or 15 minutes consecutively). Embodiments may only utilize the battery 113 on the ground, however, the battery 113 may be configured to be used for backup power in flight for redundancy.

In accordance with certain embodiments, using a high power generator on the APU, and integrating a large battery and electrically driven cabin air compressor, along with an AC-AC converter, certain embodiments open up the possibility of driving each of the APU functions either from a traditional gas turbine APU or from a battery system. The battery system can in turn be recharged either from the APU or the conventional aircraft electrical system. Embodiments provide the ability to run completely off of batteries for at least some amount of time, while retaining the full capabilities of a traditional APU for extended ground operations.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An auxiliary power unit (APU) system for an aircraft, comprising:
a fuel consuming system configured to generate and output electrical energy for use by one or more aircraft system, the fuel consuming system including a fuel consuming APU; and
an APU generator operatively connected to the fuel consuming APU and configured to convert APU motion into APU generator alternating current (AC);
a battery system configured to output stored electrical energy for use by the one or more aircraft systems, the battery system including:
a battery configured to output battery direct current (DC); and
a battery controller configured to control discharging and/or charging of the battery;
a high voltage AC line operatively connected to the generator;
an AC-AC converter disposed on the high voltage AC line and configured to receive battery energy AC to condition the battery energy AC to be used by an engine starter or to be used by an aircraft electrical bus; and at least one of:
an AC-DC converter disposed between the high voltage AC line and the battery system and configured to convert the battery DC to battery energy AC to output the battery energy AC to the high voltage AC line, wherein the AC-DC converter is configured to convert APU generator AC to generator DC current for charging the battery; and/or
a DC-AC converter operatively connected to the AC-DC converter and configured to convert generator DC from the AC-DC converter and/or battery DC from the battery system into compressor AC configured to operate a cabin air compressor;
and
a control module configured to control the APU system to operate in one or more modes, independently or in any combination, the one or more modes comprising at least one of:
a battery driven engine start mode where the battery provides electrical energy to the engine starter through the AC-DC converter, the high voltage line, and the AC-AC converter;
a battery driven auxiliary electrical power mode wherein the battery provides electrical energy to the aircraft electrical bus through the AC-DC converter, the high voltage line, and the AC-AC converter; or
a battery driven cabin air mode where the battery provides electrical energy to the cabin air compressor through the DC-AC converter.

2. The APU system of claim 1, wherein the one or more modes further include at least one of:
an APU generator driven cabin air mode where the APU generator provides electrical energy to the cabin air compressor through the AC-DC converter and then the DC-AC converter;
an APU generator driven auxiliary electrical power mode where the APU generator provides electrical energy to the aircraft electrical bus through the AC-AC converter;
an APU generator driven engine start mode where the APU generator provides electrical energy to the engine starter through the AC-AC converter;
an APU generator driven battery charging mode where the APU generator provides electrical energy to the battery through the AC-DC converter and the battery controller to charge the battery; and/or
an aircraft electrical bus driven battery charging mode where the aircraft electrical bus provides electrical energy to the battery through the AC-AC converter, the AC-DC converter, and the battery controller to charge the battery.

3. An aircraft, comprising:
an auxiliary power unit (APU) system for an aircraft, comprising:
a fuel consuming system configured to generate and output electrical energy for use by one or more aircraft system, the fuel consuming system including:
a fuel consuming APU; and
an APU generator operatively connected to the fuel consuming APU and configured to convert APU motion into APU generator alternating current (AC);
a battery system configured to output stored electrical energy for use by the one or more aircraft systems, the battery system including:
a battery configured to output battery direct current (DC); and
a battery controller configured to control discharging and/or charging of the battery;
a high voltage AC line operatively connected to the generator;
an AC-AC converter disposed on the high voltage AC line and configured to receive battery energy AC to condition the battery energy AC to be used by an engine starter or to be used by an aircraft electrical bus; and at least one of:
an AC-DC converter disposed between the high voltage AC line and the battery system and configured to convert the battery DC to battery energy AC to output the battery energy AC to the high voltage AC line, wherein the AC-DC converter is configured to convert APU generator AC to generator DC current for charging the battery; and/or
a DC-AC converter operatively connected to the AC-DC converter and configured to convert generator DC from the AC-DC converter and/or battery DC from the battery system into compressor AC configured to operate a cabin air compressor;
and
a control module configured to control the APU system to operate in one or more modes, independently or in any combination, the one or more modes comprising at least one of:
a battery driven engine start mode where the battery provides electrical energy to the engine starter through the AC-DC converter, the high voltage line, and the AC-AC converter;
a battery driven auxiliary electrical power mode wherein the battery provides electrical energy to the aircraft electrical bus through the AC-DC converter, the high voltage line, and the AC-AC converter; or
a battery driven cabin air mode where the battery provides electrical energy to the cabin air compressor through the DC-AC converter.

4. The aircraft of claim 3, wherein the one or more modes further includes at least one of: an APU generator driven cabin air mode where the APU generator provides electrical energy to the cabin air compressor through the AC-DC converter and then the DC-AC converter;
an APU generator driven auxiliary electrical power mode where the APU generator provides electrical energy to the aircraft electrical bus through the AC-AC converter;
an APU generator driven engine start mode where the APU generator provides electrical energy to the engine starter through the AC-AC converter;
an APU generator driven battery charging mode where the APU generator provides electrical energy to the battery through the AC-DC converter and the battery controller to charge the battery; and/or an aircraft electrical bus driven battery charging mode where the aircraft electrical bus provides electrical energy to the battery through the AC-AC converter, the AC-DC converter, and the battery controller to charge the battery.

5. The APU system of claim 4, wherein the control module is configured to operate the system in the APU generator driven cabin air mode, the APU generator driven auxiliary electrical power mode, the APU generator driven engine start mode, and/or the APU generator driven battery charging mode for no more than 15 minutes consecutively, and to use the battery driven engine start mode, and/or the battery driven cabin air mode in such a manner that more than 15 minutes of usage of the APU is prevented to reduce APU noise pollution.

6. A method, comprising:
switching between a fuel consuming APU system and a battery system to provide electrical energy to one or more aircraft systems such that the fuel consuming APU system is limited to operating only for a predetermined period of time consecutively, wherein when the fuel consuming APU system is not providing electrical energy to the one or more aircraft systems, the battery system is providing electrical energy to the one or more aircraft systems, wherein providing electrical energy to the one or more aircraft systems includes providing electrical energy to at least one of an engine starter or a cabin air compressor, and wherein providing electrical energy to the one or more aircraft systems includes providing battery energy AC to be used by an engine starter or to be used by an aircraft electrical bus via an AC-AC converter disposed on the high voltage AC line configured to receive APU generator AC or battery energy AC.

7. The method of claim 6, wherein providing electrical energy to the one or more aircraft systems includes providing electrical energy to an aircraft electrical bus.

* * * * *